United States Patent [19]
Forsyth et al.

[11] 3,927,071
[45] Dec. 16, 1975

[54] SALICYLANILIDES

[75] Inventors: Bruce Adam Forsyth, Croydon; David Ernest Pryor, Balwyn, both of Australia

[73] Assignee: ICI Australia Limited, Melbourne, Australia

[22] Filed: Apr. 30, 1973

[21] Appl. No.: 355,813

[30] Foreign Application Priority Data

| May 12, 1972 | Australia | 8942/72 |
| Aug. 3, 1972 | Australia | 9940/72 |
| Dec. 5, 1972 | Australia | 1505/72 |

[52] U.S. Cl. .......... 260/479 R; 260/559 S; 424/230
[51] Int. Cl.² ................ C07C 103/76; C07C 69/14
[58] Field of Search ........................... 260/559, 479

[56] References Cited
UNITED STATES PATENTS

| 3,147,300 | 9/1964 | Schraufstatter et al. | 260/559 |
| 3,331,874 | 7/1967 | Stecker | 260/559 |
| 3,332,996 | 7/1967 | Zerweck et al. | 260/559 |

*Primary Examiner*—Harry I. Moatz
*Attorney, Agent, or Firm*—Cushman, Darby & Cushman

[57] ABSTRACT

Compounds of 3,5-diiodo-2'-trifluoromethyl-4'-chloro-salicylanilide and the acetyl derivative thereof as well as compounds of 3,5-diiodo-3'-trifluoromethyl-4'-bromo salicylanilide and the acetyl derivatives thereof are disclosed.

2 Claims, No Drawings

SALICYLANILIDES

This invention relates to compositions for killing internal parasites of warm blooded animals; in particular it relates to compositions for killing trematodes or nematodes. An example of a trematode is the liver fluke (*Fasciola hepatica*) which is a parasite of bile ducts of the liver of ruminants, such as cattle, sheep and goats. The liver fluke each year causes a significant amount of economic loss, not only from the death of the host animal but also from the deterioration in the value of meat and wool produced by infected animals. In cattle a loss in milk yield from liver fluke infection will also occur and in addition the loss sustained by the condemnation of infected livers as human food may also be considerable.

An example of a nematode is *Haemonchus contortus* which is a nematode parasitic in the abomasum or fourth stomach of ruminants. It is a blood sucking parasite and when present in large numbers can cause anaemia and finally the death of the host. It can cause extensive losses, not only in the value of the animals which it may kill but also in the diminished production of commercial items such as wool and meat. There is therefore a commercial need to treat animals with chemicals which are both safe and effective in reducing the incidence and severity of diseases caused by both trematodes and nematodes.

It has previously been proposed to use certain salicylanilides as flukicides. Thus Australian Patent Application No. 34997/63 discloses the use of 3,5,4'-trihalosalicylanilides and Australian Patent No. 277925 discloses the use of 3,5,3',4'-tetrachlorosalicylanilide. We have now found a class of salicylanilides which possesses a hitherto undiscovered, an unexpectedly high, flukicidal activity. The compounds of our invention are markedly superior to both the trihalo compounds of Australian Patent Application No. 34997/63 and the tetrachloro compound of Australian Patent No. 277925. Certain of our compounds also possess high activity against nematodes such as *Haemonchus contortus*.

Accordingly we provide a compound of general formula I.

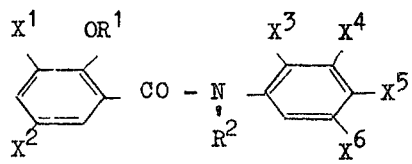

wherein $R^1$ is hydrogen or lower acyl, $R^2$ is hydrogen, lower acyl or lower alkyl, $X^1$ and $X^2$ which may be the same or different are bromine or iodine atoms; $X^3$, $X^4$, $X^5$ and $X^6$ which may be the same or different are chlorine, bromine, iodine, trifluoromethyl or hydrogen; at least two and not more than two of $X^3$, $X^4$, $X^5$ and $X^6$ are hydrogen; when $X^3$ is chlorine, bromine, iodine or trifluoromethyl, then $X^4$ and $X^6$ are both hydrogen; and at least one of $X^3$, $X^4$, $X^5$ and $X^6$ is trifluoromethyl. By lower acyl we mean an acyl group containing 1 to 6 carbon atoms, preferably the acyl group is acetyl. Preferably $X^1$ is the same as $X^2$.

We also provide compositions for eradicating certain internal parasites in warm blooded animals comprising as active ingredient a compound of general formula I.

We have found that 3,5-diiodo-3',5'-di(trifluoromethyl) salicylanilide and its acetyl derivatives are of particular interest in the eradication of liver fluke.

The active ingredients of our parasiticidal compositions may be prepared by the reaction of a suitably substituted salicyclic acid or salicylic acid derivative with a suitably substituted aniline.

Accordingly we also provide a process for the manufacture of the compounds of general formula I which process comprises reacting a compound of general formula II:

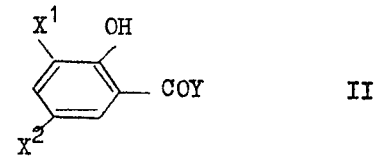

with an aniline of general formula III:

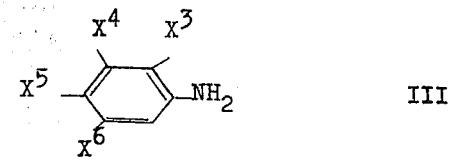

wherein $X^1$, $X^2$, $X^3$, $X^4$, $X^5$ and $X^6$ are as defined hereinabove, and Y is a hydroxy group or a chlorine or bromine atom.

The acylated compounds are prepared by the acylation of the reaction product from this process for example by treatment with an acid chloride.

The compositions of the present invention have utility in the field of animal therapy. They are effective anthelmintics and are especially effective against both mature and immature liver fluke of the Fasciola genus. Many of the compositions of the invention also possess activity against nematodes such as *Haemonchus contortus*.

The high activity against immature liver fluke and *Haemonchus contortus* is surprising as in general, flukicides are markedly less active against immature liver fluke than adult fluke and in addition often have no effect on nematodes such as *Haemonchus contortus*.

We also provide a method of treating warm blooded animals to eradicate certain internal parasites; such method comprises administering to said warm blooded animals a therapeutic dose of a composition comprising as active ingredient a compound of formula I as defined hereinbefore.

For effective treatment, certain dosage levels are desired depending upon the compound employed, the type of animal to be treated, and the particular helminth being combatted. In general, effective fluke efficacy is achieved when the composition is administered in a single dose at dosage levels of from about 1 to 50 mg. active ingredient/kg. of animal body weight, and preferably from about 3 to 20 mg. active ingredient per kg. of animal body weight.

The compositions of the present invention may be administered in a variety of ways, depending upon the particular animal employed, the type of anthelmintic treatment normally given to such an animal, the materials employed, and the particular helminths being combatted. It is preferred to administer them in a single

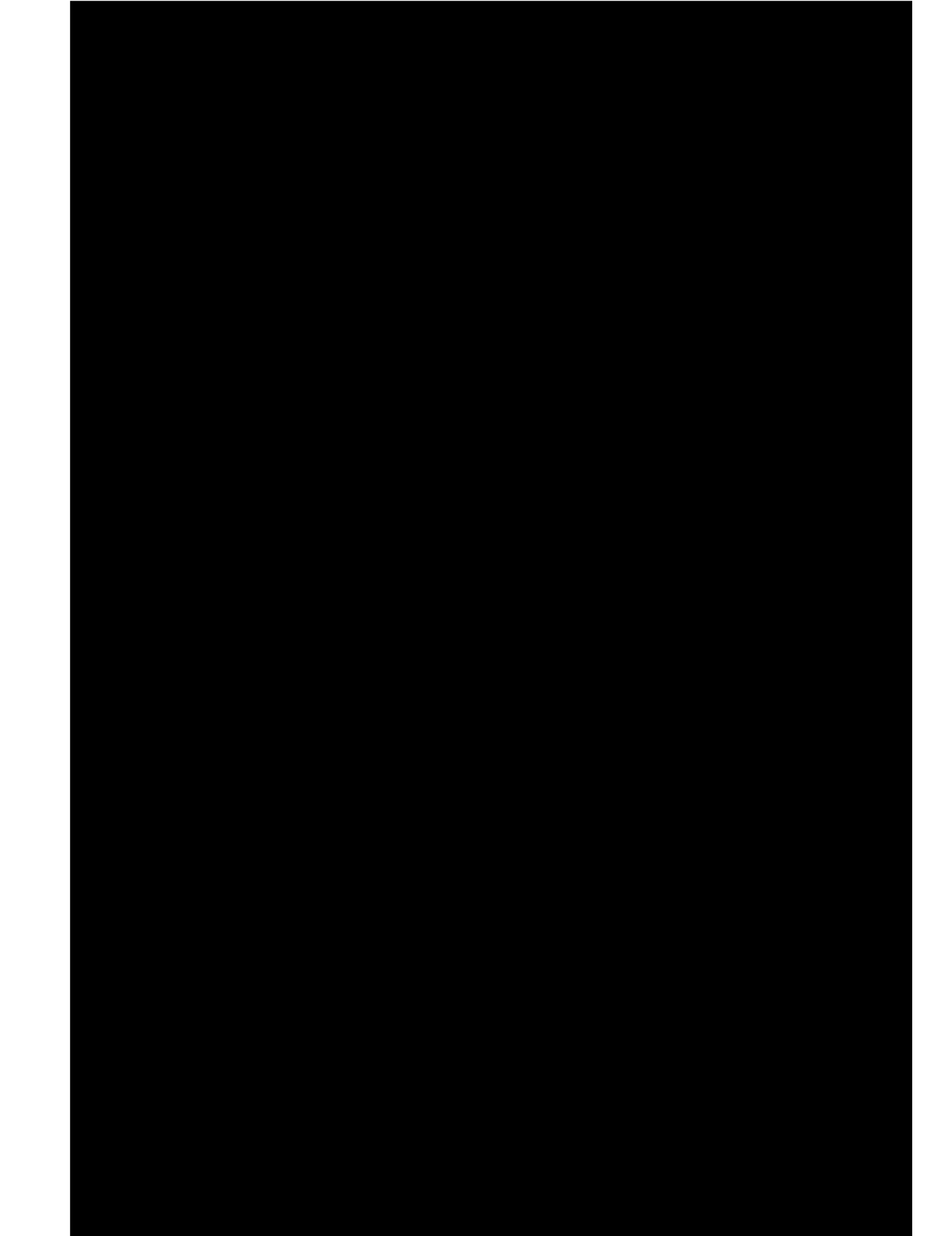

hours at room temperature and the filtered crystals were washed with hot water and recrystallized from acetic acid to give needle-like crystals melting at 212°C. The structure was verified by infra-red spectroscopy and mass-spectroscopy.

the number of adult flukes in the liver counted. The amount and structure of active ingredient in each composition and the results of treatment of a sheep with that composition are given in the Table I below.

TABLE I

| ACTIVE INGREDIENT | | FAECAL EGG COUNT (EGGS PER G. OF FAECES) ON DAY | | | | | POST MORTEM RESULTS | |
| --- | --- | --- | --- | --- | --- | --- | --- | --- |
| Structure | Dose Rate mg/kg | 0 | 4 | 7 | 10 | 1 | Sheep killed on day | No. of adult fluke |
| [3,5-diiodo-2',6'-bis(trifluoromethyl)salicylanilide structure] | 5 | 400 | | | | 0 | 13 | 0 |
| [3,5-diiodo-4'-chloro-2'-trifluoromethyl salicylanilide structure] | 5 | 210 | | | 0 | | 10 | 0 |
| [3,5-diiodo-4'-bromo-3'-trifluoromethyl salicylanilide structure] | 2.5<br>5 | 720<br>190 | | | 0<br>0 | | 10<br>10 | 0<br>0 |

EXAMPLE 2

The process of Example 1 was repeated except that instead of 3,5-diiodosalicyl chloride and 2,4-dibromoaniline the reagents shown below were used in similar proportions to give the product shown. The structure of the products was verified by infra-red spectroscopy and mass-spectroscopy.

| Experiment No. | Starting Materials | | Product Structure | °C m.p. |
| --- | --- | --- | --- | --- |
| | Salicyl chloride | Aniline | | |
| 1 | 3,5-diiodo | 4-chloro-2-trifluoromethyl | 3,5-diiodo-4'-chloro-2'-trifluoromethyl-salicylanilide | 167 |
| 2 | 3,5-diiodo | 4-bromo-3-trifluoromethyl | 3,5-diiodo-4'-bromo-3'-trifluoromethyl-salicylanilide | 182 |

EXAMPLE 3

Compositions suitable for use as experimental aqueous drenches were prepared in the following general manner. A mixture of the required amount of active ingredients was mixed with 40 ml of an aqueous 0.25% w/w solution of 'Lubrol E' ('Lubrol E' is a Trade Mark for an octylphenol ethoxylate). The mixture was ball-milled for 30 minutes and the resultant suspension was used as an aqueous drench.

EXAMPLE 4

Compositions prepared by the method of Example 7 were used as a single dose drench for use to treat sheep infected with sheep liver fluke (*Fasciola hepatica*). The number of liver fluke eggs in the faeces was measured at the time of treatment and 4, 7, 8 and 10 days after treatment. After treatment, the sheep were killed and

EXAMPLE 5

Compositions prepared by the method of Example 7 were used as a single dose drench for use to treat sheep infected with immature sheep liver fluke (*Fasciola hepatica*).

Infective metacercariae of the liver fluke are obtained from laboratory cultures of the snail intermediate host (*Lymnaea tometosa*) and counted so that 300 of these metacercariae can be given by mouth to sheep known to be free of the liver fluke. When the resultant developing infection of liver fluke reaches a prescribed age (usually 6 weeks) sheep are then treated with the said composition at various dose rates. The infection is then allowed to develop to maturity and when the liver fluke are 12 to 14 weeks of age the sheep are killed and all liver fluke remaining in the liver are removed and counted. The numbers of liver fluke in the treated animals are then compared with those in similar untreated (control) animals and the efficiency of the treatment is then calculated.

The amount and structure of active ingredient in each compound and the results obtained at post mortem and time of post mortem after dose of treatment of a sheep with that composition are given in Table II below.

TABLE II

| ACTIVE INGREDIENT | % EFFICIENCY AGAINST IMMATURE | | | |
|---|---|---|---|---|
| Structure | Dose Rate mg/kg | 4 weeks | 6 weeks | 8 weeks | 10 weeks |
| [Structure: 3,5-diiodo-2'-trifluoromethyl-4'-chlorosalicylanilide] | 8 | | 91.2 | | |

EXAMPLE 6

Compositions prepared by the method of Example 7 were used as a single dose drench for use to treat sheep infested with haemonchus which had been infected 10 days previously with 3000 infective larvae of *Haemonchus contortus*. These infective larvae had been obtained by culturing the faeces of an infected donor sheep for one week at a temperature of 78°F.

When the infection of *Haemonchus contortus* was 28 days old and mature, all treated sheep together with a number of infected control sheep were killed and the worms in their stomach recovered by washing and sieving from the stomach contents. The treatments were assessed by comparing the worm numbers in the treated animals with those in the control animals.

The amount and structure of active ingredient in each composition and the results of treatment of a sheep with that composition are given in Table III below:

The experiment was repeated using sheep infected with Haemonchus 28 days previously.

TABLE III

| ACTIVE INGREDIENT Structure | Dose Rate mg/kg | % Efficiency mature Haemonchus | % Efficiency 10 day old Haemonchus |
|---|---|---|---|
| [Structure: 3,5-diiodo-2',6'-bis(trifluoromethyl)salicylanilide] | 6 | 98 | |
| [Structure: 3,5-diiodo-3'-trifluoromethyl-4'-bromosalicylanilide] | 4 | 80 | |
| [Structure: 3,5-diiodo-2'-trifluoromethyl-4'-chlorosalicylanilide] | 8 | | 98 |

We claim:
1. A compound 3,5-diiodo-2'-trifluoromethyl-4'-chlorosalicylanilide.
2. A compound 3,5-diiodo-3'-trifluoromethyl-4'-bromo salicylanilide.

* * * * *